United States Patent
Bollstrom et al.

(10) Patent No.: US 11,745,529 B2
(45) Date of Patent: Sep. 5, 2023

(54) METHOD FOR PRODUCING WATER-INSOLUBLE QUANTUM DOT PATTERNS

(71) Applicant: OMYA INTERNATIONAL AG, Oftringen (CH)

(72) Inventors: Roger Bollstrom, Zofingen (CH); Jamal Ftouni, Zofingen (CH)

(73) Assignee: OMYA INTERNATIONAL AG, Oftringen (CH)

( * ) Notice: Subject to any disclaimer, the term of this patent is extended or adjusted under 35 U.S.C. 154(b) by 788 days.

(21) Appl. No.: 16/614,355

(22) PCT Filed: May 18, 2018

(86) PCT No.: PCT/EP2018/063073
§ 371 (c)(1),
(2) Date: Nov. 16, 2019

(87) PCT Pub. No.: WO2018/215333
PCT Pub. Date: Nov. 29, 2018

(65) Prior Publication Data
US 2020/0198384 A1 Jun. 25, 2020

Related U.S. Application Data

(60) Provisional application No. 62/512,201, filed on May 30, 2017.

(30) Foreign Application Priority Data

May 23, 2017 (EP) ..................................... 17172598

(51) Int. Cl.
*B41M 3/06* (2006.01)
*B41M 3/00* (2006.01)
(Continued)

(52) U.S. Cl.
CPC ............ *B41M 3/006* (2013.01); *B41M 3/001* (2013.01); *B41M 3/142* (2013.01); *C09D 11/322* (2013.01);
(Continued)

(58) Field of Classification Search
CPC ........ B41M 3/006; B41M 3/001; B41M 3/14; B41M 3/142; B41M 3/144; B05D 3/007;
(Continued)

(56) References Cited

U.S. PATENT DOCUMENTS 8,022,117 B2 * 9/2011 Deroover ............ C09B 67/0046
347/100
9,382,432 B1 7/2016 Mcdaniel
(Continued)

FOREIGN PATENT DOCUMENTS

| CN | 104591130 A | 5/2015 |
| CN | 106634183 A | 5/2017 |

(Continued)

OTHER PUBLICATIONS

CN 104591130 A (May 6, 2015)—English-language abstract from Espacenet, 1 page.
(Continued)

*Primary Examiner* — Brian K Talbot
(74) *Attorney, Agent, or Firm* — ALGM LLP; Harry J. Guttman (57) ABSTRACT

The present invention relates to a method for producing water-insoluble quantum dot patterns on and/or within a substrate. The method comprises a step of depositing a deliquescent salt, quantum dots and an acid or salt thereof onto at least one surface region of a substrate such that the deliquescent salt, the quantum dots and the acid or salt thereof are at least partially contacted to form said at least one water-insoluble pattern.

18 Claims, 2 Drawing Sheets

(51) Int. Cl.
*B41M 3/14* (2006.01)
*C09D 11/322* (2014.01)
*C09D 11/38* (2014.01)
*C09D 11/54* (2014.01)
*B05D 3/00* (2006.01)
*B05D 5/06* (2006.01)
*B05D 1/26* (2006.01)
*B05D 1/18* (2006.01)
*B05D 1/02* (2006.01)
*B05D 1/30* (2006.01)
*B05D 1/00* (2006.01)
*B05D 3/02* (2006.01)
*B05D 1/28* (2006.01)

(52) U.S. Cl.
CPC .............. *C09D 11/38* (2013.01); *C09D 11/54* (2013.01); *B05D 1/002* (2013.01); *B05D 1/02* (2013.01); *B05D 1/18* (2013.01); *B05D 1/26* (2013.01); *B05D 1/28* (2013.01); *B05D 1/30* (2013.01); *B05D 3/007* (2013.01); *B05D 3/0254* (2013.01); *B05D 5/06* (2013.01); *B05D 5/065* (2013.01); *B41M 3/14* (2013.01); *B41M 3/144* (2013.01)

(58) Field of Classification Search
CPC ........ B05D 3/0254; B05D 5/06; B05D 5/065; B05D 1/002; B05D 1/02; B05D 1/18; B05D 1/26; B05D 1/28; B05D 1/30
USPC ........................................................ 427/256
See application file for complete search history.

(56) References Cited

U.S. PATENT DOCUMENTS

| | | | |
|---|---|---|---|
| 10,311,994 B2 | 6/2019 | He et al. | |
| 2005/0031838 A1 | 2/2005 | Lagunowich et al. | |
| 2007/0225402 A1 | 9/2007 | Choi et al. | |
| 2009/0206162 A1* | 8/2009 | De Cremer | C09K 11/02 235/491 |
| 2009/0314991 A1 | 12/2009 | Cho et al. | |
| 2011/0101240 A1 | 5/2011 | Barbera-Guillem | |
| 2012/0031576 A1 | 2/2012 | Gane et al. | |
| 2012/0269736 A1* | 10/2012 | Green | B82Y 5/00 977/774 |
| 2014/0151996 A1 | 6/2014 | Camus | |
| 2015/0366073 A1* | 12/2015 | Magdassi | H05K 3/125 264/494 |
| 2018/0333975 A1* | 11/2018 | Bollström | D21H 17/675 |
| 2018/0340298 A1* | 11/2018 | Bollström | G07D 7/1205 |
| 2020/0198386 A1* | 6/2020 | Bollstrom | B41M 3/142 |

FOREIGN PATENT DOCUMENTS

| | | |
|---|---|---|
| EP | 1712523 A1 | 10/2006 |
| EP | 1712597 A1 | 10/2006 |
| EP | 2054233 | 2/2008 |
| EP | 2163392 A1 | 3/2010 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2660066 A1 | 11/2013 |
| EP | 2698404 A1 | 2/2014 |
| EP | 2949813 A1 | 12/2015 |
| EP | 3053743 A1 | 8/2016 |
| EP | 3067214 A1 | 9/2016 |
| EP | 3067215 A1 | 9/2016 |
| EP | 3173247 A1 | 5/2017 |
| EP | 3173522 A1 | 5/2017 |
| EP | 3293010 A1 | 3/2018 |
| EP | 3293011 A1 | 3/2018 |
| EP | 3293322 A1 | 3/2018 |
| JP | 2010001425 A | 1/2010 |
| JP | 2012-51357 A | 3/2012 |
| JP | 2012-236369 A | 12/2012 |
| WO | 2000/039222 A1 | 7/2000 |
| WO | 2008/024542 A1 | 2/2008 |
| WO | 2009/074492 A1 | 6/2009 |
| WO | 2013/142473 A1 | 9/2013 |
| WO | 2017/030907 A1 | 2/2017 |
| WO | 2017/052701 A1 | 3/2017 |

OTHER PUBLICATIONS

CN 106634183 A (May 10, 2017)—English-language abstract from Espacenet, 1 page.
JP 2010001425 A (Jan. 7, 2010)—English-language abstract from Espacenet, 1 page.
International Search Report from PCT/EP2018/063073 dated Jul. 13, 2018, 3 pages.
Written Opinion from PCT/EP2018/063073 dated Jul. 13, 2018, 7 pages.
JP 2012-236369 A (Dec. 6, 2012)—English-language abstract from Espacenet, 1 page.

* cited by examiner

METHOD FOR PRODUCING WATER-INSOLUBLE QUANTUM DOT PATTERNS

The present invention relates to a method and a corresponding printing ink set for producing a water-insoluble pattern containing quantum dots on and/or within a substrate. The invention further relates to said substrate comprising the water-insoluble pattern according to the present invention and to corresponding products including paper- and textile-based products.

Due to the improved performance of desktop printers and colour-photocopiers, the opportunities for document fraud have increased dramatically. Apart from techniques such as stamping, punching, or embossing, paper and paper-based products may be marked with an identifying image or pattern by incorporating watermarks in order to improve counterfeit protection. Tamper-proof markings may be useful to verify the authenticity of a document, e.g. a passport, driving license, bank card, credit card, voucher, tax banderol, stamp, certificate, or means any of payment. Moreover, paper manufactures have to contend with the problem that in particular their label papers and packaging papers are used in counterfeited products.

Similar problems may be observed in the field of consumer goods, where product- and brand piracy are widespread and worldwide phenomena. Significant increases in counterfeiting were observed in the categories foodstuffs, alcoholic beverages, jewellery and other accessories, mobile phones, physical media, toys and games, medicines, car parts and accessories, and office stationery. Products such as ink cartridges and toners, sporting articles and garments in general, cigarettes and other tobacco products, machines and tools, lighters, labels, tags and stickers are also often subject to counterfeiting.

Thus, there is a continuous and increasing need for methods for discretely tagging the aforementioned items in order to verify their origin.

In this connection, US 2005/0031838 A1 discloses a taggant security system for preventing the counterfeiting of goods associated with a paper product. The taggant security system includes a paper product coating located on a paper product, wherein the taggant security system further includes one or more fluorescent inks or dyes, phosphors, polymer fibers or particles. However, the inclusion of the aforementioned taggants can lead to problems during paper production such as repulping.

WO 2008/024542 A1 describes a method, wherein a reflective feature is formed by a direct write-printing process using an ink comprising metallic particles to produce reflective features.

US 2014/0151996 A1 relates to security elements with an optical structure making it possible to vary the appearance of the security element when the viewing angle is modified. However, these security elements are visible to the naked eye, and thus, can be easily recognised by a potential counterfeiter.

WO 2017/052701 A1 discloses a security ink which includes a liquid medium having a plurality of quantum dots disposed therein. Upon excitation with a suitable light source, the ink exhibits a quantum yield greater than 30%, and a photoluminescence which has a lifetime of more than 40 nanoseconds. The ink containing the quantum dots may be applied to a substrate by any suitable method of ink deposition including inkjet printing.

The applicant would further like to mention its European patent application published as EP 2 949 813 A1 which discloses a method for manufacturing a surface-modified material on a substrate, wherein a coating layer comprising a salifiable alkaline or alkaline earth compound present on at least one side of the substrate is treated with a liquid composition comprising an acid to form a surface-modified region on the coating layer.

European patent application published as EP 3 067 214 A1 on behalf of the present applicant is directed to a method for creating a hidden pattern, wherein a liquid treatment composition comprising at least one acid is deposited by inkjet printing onto a substrate which comprises at least one external surface comprising a salifiable alkaline or alkaline earth compound.

EP 3 067 215 A1 on behalf of the present applicant relates to an inkjet printing method, wherein a liquid treatment composition comprising at least one acid and an ink are deposited onto a substrate simultaneously or consecutively by inkjet printing, wherein the substrate comprises a coating layer comprising a salifiable alkaline metal or alkaline earth metal compound.

Further to the aforementioned applications, EP 3 173 522 A1 discloses a method of tagging a substrate with a covert, spectroscopically detectable security feature. EP 3 173 247 A1 relates to a method of manufacturing a substrate with an embedded, UV-visible pattern.

For the sake of completeness, the applicant would like to mention its unpublished European patent applications no. 16 188 664.3 which relates to a method for manufacturing a water-insoluble pattern, no. 16 188 656.9 relating to a method of creating a pattern on a natural material, and no. 16 188 665.0 directed to a method for increasing the slip resistance of a substrate.

However, due to the rapid technological progress, some of the aforementioned security elements may be easy to identify and, eventually, may be copied or imitated by skilled counterfeiters. Accordingly, there is still a need for improved taggings serving as security element to reduce the risk of counterfeiting or the risk of product- and brand piracy.

Accordingly, it is one object of the present invention to provide a method for creating a reliable security element.

One further object of the present invention may be seen in the provision of a method for producing a security element which, one the one hand, is difficult to identify for a potential counterfeiter by visual inspection. Preferably, one object may thus be seen in the provision of a security element or feature that is hidden or hardly visible (to the naked eye). On the other hand, it may be desirable that these security elements can be easily verified if necessary, for example by informed security personnel or by customs officers.

In this respect, it is also desirable that the security element offers the opportunity to create a great variety of specific optical fingerprint security features, which can be assigned to different manufactures and/or can be delivered to different customers.

It is also desirable that the method is easy to implement in existing printing facilities on both, small and large scale. Furthermore, it is desirable that the method can be used with a great variety of substrates.

One further object may be seen in the provision of a security element or tag which is resistant towards mechanical stress if used with everyday items.

The foregoing and other objects are solved by the subject-matter as defined herein in the independent claims.

A first aspect of the present invention relates to a method for producing a water-insoluble pattern on and/or within a substrate, the method comprising the following steps:

(a) providing a substrate;

(b) providing a deliquescent salt comprising a cation;
(c) providing quantum dots;
(d) providing an acid comprising or being capable of forming an anion, or a salt thereof comprising said anion,
wherein the deliquescent salt and the acid or salt thereof are selected such that the cation of the deliquescent salt and the anion of the acid or salt thereof are capable of forming a water-insoluble salt; and
(e) depositing the deliquescent salt provided in step (b), the quantum dots provided in step (c) and the acid or salt thereof provided in step (d) onto at least one surface region of the substrate provided in step (a) such that the deliquescent salt, the quantum dots and the acid or salt thereof are at least partially contacted to form at least one water-insoluble pattern on and/or within said substrate,
wherein (i) the deliquescent salt and the quantum dots are deposited simultaneously, preferably before depositing the acid or salt thereof, or (ii) the deliquescent salt and the quantum dots are deposited consecutively in any order, preferably before depositing the acid or salt thereof.

The inventors surprisingly found that applying a deliquescent salt, quantum dots and an acid or salt thereof, the anion of which being capable of forming a water-insoluble salt with the cation of said deliquescent salt, onto a substrate (e.g. a paper substrate) leads to the formation of a water-insoluble pattern composed of a stable network including cations of the deliquescent salt, anions of the acid and quantum dots. The method provides a stable water-insoluble pattern on and/or within said substrate which may have any conceivable shape. The pattern produced according to the inventive method may be visible or hidden and represents a reliable and resistant security element. Apart from the production of countless possible shapes, the inventive method allows for the incorporation and permanent fixation of quantum dots which, in turn, provide additional flexibility and allow for the production of very specific security elements that can be designed and adapted individually for each tagged item.

Another aspect of the present invention relates to a substrate comprising the water-insoluble pattern obtainable by the inventive method.

Still another aspect relates to a product comprising the substrate comprising said water-insoluble pattern, wherein the product is a tool for bioassays, a microfluidic device, a lab-on-a-chip device, a paper-based analytical and/or diagnostic tool, a separation platform, a print medium, a packaging material, a data storage, a security document, a non-secure document, a decorative substrate, a drug, a tablet, a pill, a tobacco product, a bottle, a garment, a container, a sporting good, a toy, a game, a mobile phone, a CD, a DVD, a blue ray disk, a machine, a tool, a car part, a sticker, a label, a tag, a poster, a passport, identification card, a driving license, a bank card, a credit card, a bond, a ticket, a voucher, a postage stamp, a tax stamp, a banknote, a certificate, a brand authentication tag, a business card, a greeting card, a tactile document, or a wall paper.

Still another aspect relates to the use of a substrate comprising said water-insoluble pattern in printing applications, in analytical applications, in diagnostic applications, in bioassays, in chemical applications, in electrical applications, in security devices, in overt or covert security elements, in brand protection, in micro lettering, in micro imaging, in decorative, artistic or visual applications, or in packaging applications.

One further aspect of the present invention relates to a printing ink set for producing a water-insoluble pattern on and/or within a substrate, the set comprising:
(i) a first set component that contains a deliquescent salt comprising a cation;
(ii) a second set component that contains quantum dots; and
(iii) a third set component that contains an acid comprising or being capable of forming an anion, or a salt thereof comprising said anion;
characterized in that the deliquescent salt and the acid or salt thereof are selected such that the cation of the deliquescent salt and the anion of the acid or salt thereof are capable of forming a water-insoluble salt.

One further similar aspect of the present invention relates to a printing ink set for producing a water-insoluble pattern on and/or within a substrate, the set comprising:
(i) a first set component that contains a deliquescent salt comprising a cation, and quantum dots; and
(ii) a second set component that contains an acid comprising or being capable of forming an anion, or a salt thereof comprising said anion;
characterized in that the deliquescent salt and the acid or salt thereof are selected such that the cation of the deliquescent salt and the anion of the acid or salt thereof are capable of forming a water-insoluble salt.

The following terms used throughout the present application shall have the meanings set forth hereinafter:

A "pattern" is understood to be a material comprising a water-insoluble salt which is formed in a specific shape such as a channel, a barrier, a one-dimensional bar code, a two-dimensional bar code, a three-dimensional bar code, a security mark, a number, a letter, an alphanumerical symbol, a text, a logo, an image, a braille marking, or a shape. These mentioned examples are, however, not limiting.

In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are thus defined as materials leading to more than 0.1 g of recovered solid material following evaporation at 95 to 100° C. of 100 g of said liquid filtrate. It is noted that the term "water-insoluble" as used throughout the present application is not meant to exclude that a material is insoluble in further solvents such as aqueous mixtures with organic solvents or organic solvents alone. For example, the water-insoluble pattern of the present invention may, at the same time, be insoluble in organic solvents such as ethanol, iso-propanol, esters, ethers and the like.

In the present context, the term "substrate" is to be understood as any material having a surface suitable for printing, coating or painting, such as paper, cardboard, containerboard, plastic, cellophane, textile, wood, metal, glass, mica plate, cellulose, nitrocellulose, marble, calcite, natural stone, composite stone, brick, concrete, or natural materials of human or animal origin, preferably paper, cardboard, containerboard, or plastic. The mentioned examples are, however, not of limitative character.

In the meaning of the present invention, the expression "pattern on a substrate" refers to a pattern which is disposed on the surface of the substrate and the expression "within a substrate" refers to a pattern which is absorbed by or permeated into the bulk of the substrate.

The term "deliquescent salt" as used herein refers to a salt that has a high affinity for moisture and can collect gaseous water molecules from the atmosphere to form a mixture of the solid salt and liquid water, or an aqueous solution of the salt, until the substance is dissolved (cf. definition of "deliquescence", IUPAC, Compendium of Chemical Terminology Goldbook, version 2.3.3, 2014). Non-limiting examples of a "deliquescent salt" are magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, silver nitrate, zinc nitrate, aluminium nitrate, magnesium acetate, calcium acetate, iron acetate, copper acetate, zinc acetate or aluminium acetate.

Preferably, the term "deliquescent salt" as used herein refers to a salt that absorbs at least 18 g of $H_2O$/mol of salt, i.e. 1 mol of $H_2O$/mol of salt of water from the atmosphere, when stored for 24 h at 20° C. in an atmosphere with a water content of 14 $g/m^3$, to form a mixture of solid salt and liquid water or an aqueous solution of the salt.

For the purpose of the present invention, an "acid" is defined as Brønsted-Lowry acid, that is to say, it is an $H_3O^+$ ion donor.

A "suspension" or "slurry" comprises insoluble solids and a liquid (preferably water), and optionally further additives, and usually contains large amounts of solids and, thus, is more viscous and can be of higher density than the liquid from which it is formed.

A "solution" as referred to herein is understood to be a single phase mixture of a specific solvent and a specific solute, for example a single phase mixture of a salt and water. The term "dissolved" as used herein thus refers to the physical state of a solute in a solution.

The term "solid" according to the present invention refers to a material that is solid under standard ambient temperature and pressure (SATP) which refers to a temperature of 298.15 K (25° C.) and an absolute pressure of exactly 1 bar. The solid may be in the form of a powder, tablet, granules, flakes etc. Accordingly, the term "liquid" refers to a material that is liquid under standard ambient temperature and pressure (SATP) which refers to a temperature of 298.15 K (25° C.) and an absolute pressure of exactly 1 bar.

Unless specified otherwise, the term "drying" refers to a process according to which water is removed from a material to be dried such that a constant weight of the obtained "dried" material at 120° C. is reached, wherein the mass (sample size 5 g) does not change more than 1 mg over a period of 30 s.

Accordingly, a "dry" material (e.g. dry surface-reacted calcium carbonate) may be defined by its total moisture content which, unless specified otherwise, is less than or equal to 5.0 wt %, preferably less than or equal to 1.0 wt %, more preferably less than or equal to 0.5 wt %, even more preferably less than or equal to 0.2 wt %, and most preferably between 0.03 and 0.07 wt %, based on the total weight of the dried material.

Where an indefinite or definite article is used when referring to a singular noun, e.g. "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the inventive method for producing a water-insoluble pattern and the further aspects are defined in the corresponding dependent claims.

According to one embodiment of the present invention, the deliquescent salt provided in step (b), the quantum dots provided in step (c) and/or the acid or salt thereof provided in step (d) is/are provided in the form of a liquid composition, preferably the deliquescent salt provided in step (b), the quantum dots provided in step (c) and the acid or salt thereof provided in step (d) are provided in the form of a liquid composition, and wherein said liquid composition more preferably is an aqueous composition.

According to another embodiment, the deliquescent salt provided in step (b) and the quantum dots provided in step (c) are provided together in one single liquid composition, wherein the deliquescent salt and the quantum dots are deposited simultaneously, preferably before depositing the acid or salt thereof.

According to still another embodiment, the substrate is a planar substrate having a first side and a reverse side, and
  (i) the deliquescent salt provided in step (b), the quantum dots provided in step (c) and the acid or salt thereof provided in step (d) are deposited onto said first side of the substrate, or
  (ii) the deliquescent salt provided in step (b), the quantum dots provided in step (c) and the acid or salt thereof provided in step (d) are deposited onto said reverse side of the substrate.

Accordingly, in another embodiment, the substrate is a planar substrate having a first side and a reverse side, and
  (i) the deliquescent salt provided in step (b) and the quantum dots provided in step (c) are deposited onto said first side of the substrate and the acid provided in step (d) is deposited onto said reverse side of the substrate, or
  (ii) the acid or salt thereof provided in step (d) is deposited onto said first side of the substrate and the deliquescent salt provided in step (b) and the quantum dots provided in step (c) are deposited onto said reverse side of the substrate.

According to another embodiment, the method further comprises a step of drying the substrate after depositing the deliquescent salt provided in step (b), after depositing the quantum dots provided in step (c) and/or after depositing the acid or salt thereof provided in step (d).

According to still another embodiment, the deliquescent salt is selected from the group consisting of chlorates, sulphates, halides, nitrates, carboxylates, and mixtures and hydrates thereof, preferably selected from the group consisting of chlorates, sulphates, chlorides, bromides, iodides, nitrates, citrates, acetates, and mixtures and hydrates thereof, more preferably selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof, most preferably the deliquescent salt is calcium chloride.

According to another embodiment of the present invention, the quantum dots are selected from:
(i) metal-based quantum dots, preferably Cd-based quantum dots, most preferably CdTe quantum dots;
(ii) carbon quantum dots;
(iii) peptide-based quantum dots;
and mixtures of any of the foregoing.

According to still another embodiment, the acid is selected from the group consisting of hydrochloric acid, sulphuric acid, sulphurous acid, phosphoric acid, oxalic acid, tartaric acid, carbonic acid and mixtures thereof, preferably the acid is selected from the group consisting of phosphoric acid, oxalic acid, tartaric acid and mixtures thereof, and most preferably the acid is phosphoric acid.

In further embodiments of the present invention:
(i) the deliquescent salt is present in the liquid composition in an amount of from 0.1 to 100 wt %, preferably from 1 to 80 wt %, more preferably from 3 to 60 wt %, and most preferably from 10 to 50 wt %, each based on the total weight of the liquid composition;
(ii) the quantum dots are present in the liquid composition in an amount of from 20 to 0.0001 wt %, preferably from 5 to 0.001 wt %, more preferably from 1 to 0.005 wt %, still more preferably from 0.5 to 0.01 wt %, and most preferably from 0.1 to 0.01 wt %, each based on the total weight of the liquid composition; and/or
(iii) the acid or salt thereof is present in the liquid composition in an amount of from 0.1 to 100 wt %, preferably from 1 to 80 wt %, more preferably from 3 to 60 wt %, and most preferably from 10 to 50 wt %, each based on the total weight of the liquid composition.

In one particular embodiment, the deliquescent salt is calcium chloride, the quantum dots are CdTe quantum dots, and the acid is phosphoric acid.

According to still another embodiment, the substrate is selected from the group comprising paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof, preferably paper, cardboard, containerboard, or plastic, more preferably the substrate is a paper substrate.

In another embodiment, the substrate is a paper substrate that does not contain a mineral filler coating and/or an internal mineral filler.

According to still another embodiment, the deliquescent salt provided in step (b), the quantum dots provided in step (c) and/or the acid or salt thereof provided in step (d) is/are deposited by electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil, preferably by inkjet printing or spray coating.

According to still another embodiment, the water-insoluble pattern is a channel, a barrier, a one-dimensional bar code, a two-dimensional bar code, a three-dimensional bar code, a security mark, a number, a letter, an alphanumerical symbol, a text, a logo, an image, a braille marking, a shape, a design, or a combination thereof.

In the following, details and preferred embodiments of the inventive method for producing a water-insoluble pattern will be discussed. It is to be understood that these details and embodiments also apply to the substrate comprising the water-insoluble pattern obtainable by the inventive method and to any corresponding uses and products such as paper-based products or textile-based products and the like. Said details and embodiment also apply, where appropriate, to the inventive printing ink set.

(A) Substrates

According to step (a) of the method of the present invention, a substrate is provided for receiving the water-insoluble pattern.

In general, the substrate may be porous or non-porous. According to a preferred embodiment, the substrate is porous. In that case, the ink components used (the deliquescent salt, the quantum dots and the acid or salt thereof) may be at least partially absorbed by the substrate, which may increase the adhesion of the formed water-insoluble pattern on and/or within the substrate.

According to one embodiment, the substrate is a fibre based substrate comprising a polymer as additive such as, for example, polyvinyl alcohol, polyvinyl pyrrolidone, gelatine, cellulose ethers, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof, homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof. Non-limiting examples of fibre based substrates are paper, cardboard, containerboard, textile, cellulose or nitrocellulose.

According to another embodiment, the substrate is selected from the group consisting of paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof. According to a preferred embodiment, the substrate is selected from the group consisting of paper, cardboard, containerboard, or plastic, and more preferably the substrate is paper. Non-limiting examples for paper are eucalyptus fibre paper or cotton fibre paper. According to another embodiment, the substrate is a laminate of paper, plastic and/or metal, wherein preferably the plastic and/or metal are in form of thin foils such as for example used in Tetra Pak®.

According to another embodiment of the present invention, the substrate is paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board.

The paper, cardboard, or containerboard substrate can have a basis weight of from 10 to 1 000 $g/m^2$, preferably from 20 to 800 $g/m^2$, more preferably from 30 to 700 $g/m^2$, and most preferably from 50 to 600 $g/m^2$. In one embodiment, the substrate is paper, preferably having a basis weight of from 10 to 400 $g/m^2$, 20 to 300 $g/m^2$, 30 to 200 $g/m^2$, 40 to 100 $g/m^2$, 50 to 90 $g/m^2$, 60 to 80 $g/m^2$, or about 70 $g/m^2$.

According to still another embodiment, the substrate is a plastic substrate. Suitable plastic materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resin is poly(tetrafluoro ethylene).

The substrate may consist of only one layer of the above-mentioned materials or it may comprise a layer structure having several sublayers of the same material or different materials. According to one embodiment, the substrate is structured by one layer. According to another embodiment, the substrate is structured by at least two sublayers, preferably three, five, or seven sublayers, wherein the sublayers can have a flat or non-flat structure, e.g. a corrugated structure. Preferably, the sublayers of the substrate are made from paper, cardboard, containerboard and/or plastic.

A "natural material of human or animal origin" as mentioned above is any material, which is derived from the body of a living or dead human or the body of a living or dead animal. Said term also includes products produced by animals such as eggshells or pearls. The term "animal" as used herein refers to eukaryotic organisms such as mammals, fish, birds, reptiles, amphibians, insects, or molluscs. The natural material may be selected from the group consisting of a reptile eggshell, a bird eggshell, a monotreme eggshell, a tooth, a bone, a tusk, ivory, a pearl, nacre, a mollusc shell, a cuttlebone, a gladius, a corallite, a crustacean exoskeleton, a calcified fossil. In one embodiment, the natural material is selected from the group consisting of a bird eggshell, a tooth, a bone, a tusk, ivory, a pearl, nacre, or a calcified fossil. In a preferred embodiment of the present invention, the natural material is a bird eggshell, preferably a quail eggshell, a chicken eggshell, a duck eggshell, a goose eggshell, or an ostrich eggshell. The eggshell may be provided separately or in the form of an egg comprising the eggshell.

The substrate can also be a metal. For the purpose of the present invention, the term "metal" refers to pure metals and alloys. Examples of suitable metals are iron, steel, aluminium, copper, magnesium, nickel, titanium, zinc, brass, bronze, palladium, rhodium, platinum, silver, or gold.

As used hereinabove, the term "textile" refers to a product produced by methods such as by layering, plaiting, braiding, knotting, weaving, knitting, crocheting, or tufting. For the purpose of the present invention, the term "woven fabric" refers to a textile article produced by weaving, and, the term "nonwoven fabric" refers to a flat, flexible, porous sheet structure that is produced by interlocking layers or networks of fibres, filaments, or film-like filamentary structures. According to one embodiment of the present invention, the textile comprises wool, silk, cotton, flax, jute, hemp, acetate, lyocell, modal, polyester, polyamide, aramid, nylon, spandex, lurex, sisal, asbestos, glass fibres, carbon fibres, or mixtures thereof.

The substrate may be permeable or impermeable for solvents, water, or mixtures thereof. According to one embodiment, the substrate is impermeable for water, solvents, or mixtures thereof. According to a preferred embodiment, the substrate is permeable for water, solvents, or mixtures thereof. Examples for solvents include aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to one embodiment, the substrate is a planar substrate and comprises a first side and a reverse side. The term "planar substrate" in the meaning of the present invention refers to a flat substrate having a two-dimensional characteristic, i.e. the substrate has a first side and a reverse side. Examples of planar substrates are substrates in the form of a sheet, a mat, a film, a panel, or a tile.

In principle, it is possible to apply the components used in the inventive method onto any side of a (planar) substrate, for example on the same side of the substrate.

Therefore, in one embodiment, the substrate is a planar substrate having a first side and a reverse side, wherein the deliquescent salt provided in step (b), the quantum dots provided in step (c) and the acid or salt thereof provided in step (d) are deposited onto said first side of the substrate, or the deliquescent salt provided in step (b), the quantum dots provided in step (c) and the acid or salt thereof provided in step (d) are deposited onto said reverse side of the substrate.

In some cases, it may preferred to apply the components onto different sides of a (planar) substrate. Therefore, in another embodiment, the substrate is a planar substrate having a first side and a reverse side, wherein the deliquescent salt provided in step (b) and the quantum dots provided in step (c) are deposited onto said first side of the substrate and the acid or salt thereof provided in step (d) is deposited onto said reverse side of the substrate, or the acid or salt thereof provided in step (d) is deposited onto said first side of the substrate and the deliquescent salt provided in step (b) and the quantum dots provided in step (c) are deposited onto said reverse side of the substrate, and wherein the substrate preferably is a porous substrate.

In case the substrate is a paper, cardboard, containerboard, or plastic, the substrate may comprise one or more additives.

According to one embodiment, the substrate comprises an optical brightener, preferably in an amount of at least 0.001 wt %, more preferably at least 0.1 wt %, still more preferably at least 0.5 wt %, still more preferably at least 1 wt %, and most preferably at least 1.2 wt %, each based on the total weight of the substrate. In another embodiment, the optical brightener is present in an amount from 0.001 to 15 wt %, preferably from 0.1 to 10 wt %, more preferably from 0.5 to 8 wt %, even more preferably from 1 to 6 wt %, and most preferably from 1.2 to 4 wt %, each based on the total weight of the substrate. In this context, the term "optical brightener" refers to a chemical compound that absorbs light in the ultraviolet and violet region, typically between 340 and 370 nm, of the electromagnetic spectrum, and re-emits light in the blue region, typically between 420 and 470 nm, thereby causing a whiting effect of a substrate, into which it is incorporated.

The most commonly used class of optical brightener compounds are derivatives of stilbenes such as 4,4'-diamino-2,2'-stilbenedisulphonic acid. These optical brighteners absorb ultraviolet light within the range of 350 to 360 nm, and re-emit blue light at 400 to 500 nm with a maximum wavelength at 430 nm. The sulphonic acid groups contribute to the water solubility of the optical brightener, and thus, the affinity of the optical brightener for cellulose can be manipulated by changing the number of sulphonic acid groups. A disulphonic or divalent optical brightener is constituted of two sulphonic acid groups and is particularly suitable for hydrophobic fibres such as nylon, silk, and wool application at acidic pH. A tetrasulphonic or tetravalent optical brightener is constituted of four sulphonic groups, has a good water-solubility, and is particularly suitable for cellulosic fibre and paper application at neutral or alkaline pH. A hexasulphonic or hexavalent optical brightener is constituted of six sulphonic groups and has excellent solubility for surface coating application like photographic paper. Others classes of optical brighteners include derivatives of pyrazolin, cumarin, benzoxazol, naphthalimide, and pyrene.

According to one embodiment, the optical brightener is selected from the group consisting of stilbene derivatives, pyrazolin derivatives, cumarin derivatives, benzoxazol derivatives, naphthalimide derivatives, pyrene derivatives, and mixtures thereof, preferably the optical brightener is selected from the group consisting of derivatives of diaminostilbenedisulphonic acid, derivatives of diaminostilbenetetrasulphonic acid, derivatives of diaminostilbenehexasulphonic acid, 4,4'-diamino-2,2'-stilbenedisulphonic acid, 4 4'-bis(benzoxazolyl)-cis-stilbene, 2 5-bis(benzoxazol-2-yl)thiophene, 5-[(4-anilino-6-methoxy-1,3,5-triazin-2-yl)amino]-2-[(E)-2-[4-[(4-anilino-6-methoxy-1,3,5-triazin-2-yl)amino]-2-sulphonatophenyl]ethenyl] benzenesulphonate (leucophor PC), and mixtures thereof.

According to another embodiment of the present invention, the substrate comprises an additive such as bioactive molecules, for example, enzymes, chromatic indicators susceptible to change in pH or temperature, fluorescent materials, dispersants, milling aids, surfactants, rheology modifiers, lubricants, defoamers, dyes, preservatives, pH controlling agents, or mixtures of any of the aforementioned additives.

According to still another embodiment, the substrate comprises a mineral filler material such as kaolin, silica, talc, precipitated calcium carbonate (PCC), ground natural calcium carbonate (GNCC), modified calcium carbonate (MCC), or mixtures thereof.

"Ground natural calcium carbonate" (GNCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Modified calcium carbonate" (MCC) in the meaning of the present invention may feature a ground natural or precipitated calcium carbonate (i.e. GNCC or PCC) with an internal structure modification or a surface-reaction product, i.e. "surface-reacted calcium carbonate". A surface-reacted calcium carbonate is a material comprising calcium carbonate and water-insoluble, preferably at least partially crystalline, calcium salts of anions of acids on its surface. Preferably, the insoluble calcium salt extends from the surface of at least a part of the calcium carbonate. The calcium ions forming said at least partially crystalline calcium salt of said anion originates largely from the starting calcium carbonate material. MCCs are described, for example, in US 2012/0031576 A1, WO 2009/074492 A1, EP 2 264 109 A1, WO 00/39222 A1, or EP 2 264 108 A1.

A "precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. The precipitated calcium carbonate may have a vateritic, calcitic or aragonitic crystal form. Suitable PCCs are described, for example, in EP 2 447 213 A1, EP 2 524 898 A1, EP 2 371 766 A1, EP 1 712 597 A1, EP 1 712 523 A1, or WO 2013/142473 A1.

In some embodiments, the substrate may also comprise a coating layer. For the purpose of the present invention, the term "coating layer" refers to a layer, covering, film, skin etc., formed, created, prepared etc., from a coating formulation which remains predominantly on one side of the substrate. The coating layer can be in direct contact with the surface of the substrate or, in case the substrate comprises one or more precoating layers and/or barrier layers, can be in direct contact with the top precoating layer or barrier layer, respectively.

According to one embodiment, the substrate comprises a coating layer comprising an optical brightener as additive in an amount of at least 0.001 wt %, preferably at least 0.1 wt %, more preferably at least 0.5 wt %, even more preferably at least 1 wt %, and most preferably at least 1.2 wt %, each based on the total weight of the substrate. In another embodiment, the optical brightener is present in an amount from 0.001 to 15 wt %, preferably from 0.1 to 10 wt %, more preferably from 0.5 to 8 wt %, even more preferably from 1 to 6 wt %, and most preferably from 1.2 to 4 wt %, each based on the total weight of the substrate.

According to another embodiment, the substrate has a coating layer comprising an additive such as bioactive molecules, for example, enzymes, chromatic indicators susceptible to change in pH or temperature, fluorescent materials, dispersants, milling aids, surfactants, rheology modifiers, lubricants, defoamers, dyes, preservatives, pH controlling agents, or any mixture thereof.

According to still another embodiment, the substrate comprises a coating layer comprising a mineral filler material as additive such as kaolin, silica, talc, precipitated calcium carbonate, ground calcium carbonate, modified calcium carbonate or mixtures thereof.

In another embodiment, the substrate comprises a coating layer comprising a polymer as additive such as, for example, polyvinyl alcohol, polyvinyl pyrrolidone, gelatine, cellulose ethers, polyethylene glycols, ethylene glycol, polyoxazolines, polyvinylacetamides, partially hydrolyzed polyvinyl acetate/vinyl alcohol, polyacrylic acid, polyacrylamide, polyalkylene oxide, sulphonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof, homopolymers or copolymers of acrylic and/or methacrylic acids, itaconic acid, and acid esters, such as, e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

The inventors found that the pattern obtainable by the inventive method may be produced with any of the aforementioned substrates independently from whether these substrates have a mineral filler-containing coating or contain any kind of internal mineral filler because the deliquescent salt, the quantum dots and the acid or salt thereof alone are sufficient to produce the desired water-insoluble quantum dots-containing pattern. Therefore, in one embodiment, the substrate used does not contain a mineral filler coating and/or an internal mineral filler, preferably the substrate is a paper substrate that does not contain a mineral filler coating and/or an internal mineral filler.

According to one embodiment, the substrate does not contain a salifiable alkaline metal or alkaline earth metal compound. A "salifiable" compound in the meaning of the present invention is defined as a compound that is capable of reacting with an acid to form a salt. Examples of salifiable compounds are alkaline or alkaline earth oxides, hydroxides, alkoxides, methylcarbonates, hydroxycarbonates, bicarbonates, or carbonates.

Therefore, in another embodiment, the substrate does not contain an alkaline metal or alkaline earth metal oxide, an alkaline metal or alkaline earth metal hydroxide, an alkaline metal or alkaline earth metal alkoxide, an alkaline metal or alkaline metal earth methylcarbonate, an alkaline metal or alkaline earth metal hydroxycarbonate, an alkaline metal or alkaline earth metal bicarbonate, an alkaline metal or alkaline earth metal carbonate, or mixtures thereof. According to another embodiment, the substrate does not contain a calcium carbonate-containing material.

(B) Deliquescent Salts

According to step (b) of the method of the present invention, a deliquescent salt is provided. The deliquescent salt is an ionic compound and thus comprises a cation.

As already indicated hereinabove, the term deliquescent salt has a high affinity for moisture and can collect gaseous water molecules from the atmosphere to form a mixture of salt and water, or an aqueous solution of the salt, until the substance is dissolved.

In one embodiment, the deliquescent salt absorbs at least 18 g of $H_2O$/mol of salt, i.e. 1 mol of $H_2O$/mol of salt of water from the atmosphere, when stored for 24 h at 20° C. in an atmosphere having a water content of 14 g/m$^3$.

In another embodiment, the deliquescent salt provided in step (b) of the inventive method is a water-soluble salt.

The deliquescent salt used in the inventive method comprises a cation, wherein said cation and the anion of the acid or salt thereof provided in step (d) are capable of forming a water-insoluble salt. The skilled person is well familiar with selecting appropriate cation/anion pairs such that they are capable of forming the desired water-insoluble salt.

In one embodiment, said cation is a metal cation, preferably a divalent or trivalent metal cation, more preferably a divalent metal cation, and most preferably $Ca^{2+}$.

According to another embodiment, the deliquescent salt is selected from the group consisting of chlorates, sulphates, halides, nitrates, carboxylates, and mixtures and hydrates thereof, preferably selected from the group consisting of chlorates, sulphates, chlorides, bromides, iodides, nitrates, citrates, acetates, and mixtures and hydrates thereof, more preferably selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof, most preferably the deliquescent salt is calcium chloride.

For the purpose of the present invention, the deliquescent salt may be provided in any form that is compatible with the corresponding equipment. It may be provided in neat form (including solid and liquid physical state) or in the form of a composition, preferably as a liquid composition.

In a preferred embodiment, the deliquescent salt of step (b) is thus provided in the form of a liquid composition, more preferably in the form of an aqueous composition. Preferably, said liquid or aqueous composition is a suspension or a solution, more preferably a solution.

In a particularly preferred embodiment, the deliquescent salt is provided as an aqueous solution comprising the deliquescent salt, a first solvent being water and, optionally, a second, organic solvent. In another particularly preferred embodiment, the deliquescent salt is provided as an aqueous solution comprising the deliquescent salt, a first solvent being water and a second, organic solvent. In an alternative embodiment, the deliquescent salt is provided as a solution comprising the deliquescent salt and an organic solvent.

In any of the aforementioned embodiments, the organic solvent may be selected from the group consisting of aliphatic alcohols, ethers and diethers having from 4 to 14 carbon atoms, glycols, alkoxylated glycols, glycol ethers, alkoxylated aromatic alcohols, aromatic alcohols, and mixtures thereof. According to a preferred embodiment, the solvent is ethylene glycol, methanol, ethanol, propanol, or a mixture thereof, and most preferably ethanol.

In case the deliquescent salt is provided in the form of a liquid composition, for example as a suspension or solution (including aqueous solutions), the deliquescent salt may be present in an amount of from 0.1 to 100 wt %, preferably from 1 to 80 wt %, more preferably from 3 to 60 wt %, and most preferably from 10 to 50 wt %, each based on the total weight of said liquid composition.

In a particularly preferred embodiment, the deliquescent salt is selected from the group consisting of zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof, most preferably calcium chloride, wherein the deliquescent salt is provided as an aqueous solution comprising the deliquescent salt, a first solvent being water and a second, organic solvent, preferably selected from ethylene glycol, methanol, ethanol, propanol, or a mixture thereof, most preferably ethanol.

(C) Quantum Dots

The ink components used in the method according to the present invention further include quantum dots (QDs).

The skilled person is well familiar with the term quantum dot. A "quantum dot" is a polyatomic (preferably nanosized) structure that displays discrete electronic states.

Due to their small size, these structures have quantum mechanical properties in agreement with naturally occurring atoms or molecules. Therefore, quantum dots are sometimes referred to as artificial atoms. For example, quantum dots are able to emit light of a specific frequency upon excitation by electricity or light. These frequencies can be precisely tuned by changing their size, shape and material.

In principle, the present invention is not limited to a specific type or class of quantum dots and therefore, in one embodiment, the quantum dots may be selected from metal-based quantum dots, carbon quantum dots, peptide-based quantum dots and mixtures thereof.

More specifically, suitable quantum dots for use in the method according to the present invention include, without being limited to, GaP, GaAs, InP, InSb, InAs, GaSb, GaN, AlN, InN, ZnO, ZnS, ZnSe, ZnTe, CdS, CdSe, CdTe, BeSe, BeTe, HgS, GaS, GaSe, GaTe, InGaAs, InS, InSe and InTe quantum dots.

In some preferred embodiments of the present invention, the quantum dots are metal-based quantum dots. In still another preferred embodiment, the quantum dots provided in step (c) are Cd-based quantum dots, most preferably CdTe quantum dots.

According to one embodiment of the present invention, the quantum dots are carbon quantum dots, and preferably graphene quantum dots.

The quantum dots used in the present invention may be provided in any form that is compatible with the corresponding equipment and further ink components used. In general, the quantum dots may be provided in neat form or as a liquid composition.

In a preferred embodiment, the quantum dots of step (c) are provided in the form of a liquid composition, more preferably the quantum dots are provided in the form of an aqueous composition. Preferably, said liquid or aqueous composition is a suspension or a solution, more preferably a solution.

In a particularly preferred embodiment, the quantum dots are provided as an aqueous solution comprising said quantum dots, a first solvent being water and, optionally, a second, organic solvent. In another particularly preferred embodiment, the quantum dots are provided as an aqueous solution comprising said quantum dots, a first solvent being water and a second, organic solvent. In an alternative embodiment, the quantum dots are provided in the form of a solution comprising the deliquescent salt and an organic solvent.

In any of the aforementioned embodiments, the organic solvent may be selected from the group consisting of aliphatic alcohols, ethers and diethers having from 4 to 14 carbon atoms, glycols, alkoxylated glycols, glycol ethers, alkoxylated aromatic alcohols, aromatic alcohols, and mixtures thereof. According to a preferred embodiment, the solvent is ethylene glycol, methanol, ethanol, propanol, or a mixture thereof, and most preferably ethanol.

To improve the performance and compatibility in an aqueous environment, the quantum dots may be functionalized. In one embodiment, the quantum dots are COOH functionalized. In a particularly preferred embodiment, the quantum dots are thus COOH functionalized metal-based quantum dots, preferably COOH functionalized Cd-based quantum dots, and most preferably COOH functionalized CdTe quantum dots.

In case the quantum dots are provided in the form of a liquid composition, for example as a suspension or solution (including aqueous solutions), the quantum dots may be present in the liquid composition in an amount of from 20 to 0.0001 wt %, preferably from 5 to 0.001 wt %, more preferably from 1 to 0.005 wt %, still more preferably from 0.5 to 0.01 wt %, and most preferably from 0.1 to 0.01 wt %, each based on the total weight of the liquid composition.

(D) Acids

In step (c) of the process according to the present invention, an acid or a salt thereof is provided as a further ink component.

As used herein, an acid is meant to be a Brønsted-Lowry acid, that is to say, it is an $H_3O^+$ ion donor which includes protic salts, such as $NaH_2PO_4$. Accordingly, the acid comprises an anion or it is capable of forming an anion by dissociation. It is also possible to use the corresponding nonprotic salts comprising said anion. For example, where phosphoric acid ($H_3PO_4$) or monosodium phosphate ($NaH_2PO_4$) are used as the acid, it would in principle also be possible to use any nonprotic salt thereof, such as $Na_3PO_4$.

According to one embodiment, the acid is selected from the group consisting of hydrochloric acid, sulphuric acid, sulphurous acid, phosphoric acid, oxalic acid, tartaric acid, carbonic acid and mixtures thereof, preferably the acid is selected from the group consisting of phosphoric acid, oxalic acid, tartaric acid and mixtures thereof, and most preferably the acid is phosphoric acid.

According to a preferred embodiment, the acid or the salt thereof are selected from the group consisting of hydrochloric acid, sulphuric acid, sulphurous acid, phosphoric acid, oxalic acid, tartaric acid, salts of any of the foregoing acids, lithium bicarbonate, sodium bicarbonate, potassium bicarbonate, lithium carbonate, sodium carbonate, potassium carbonate and mixtures thereof, most preferably the acid or the salt thereof is an acid selected from the group consisting of phosphoric acid, oxalic acid, tartaric acid and mixtures thereof.

The acid or salt thereof used in the present invention may be provided in any form that is compatible with the corresponding equipment and further ink components used. In general, the acid or salt thereof may be provided in neat form or as a liquid composition.

In a preferred embodiment, the acid or salt thereof of step (c) are provided in the form of a liquid composition, more preferably the acid or salt thereof are provided in the form of an aqueous composition. Preferably, said liquid or aqueous composition is a suspension or a solution, more preferably a solution.

In a particularly preferred embodiment, the acid or salt thereof are provided as an aqueous solution comprising said acid or salt thereof, a first solvent being water and, optionally, a second, organic solvent. In another particularly preferred embodiment, the acid or salt thereof are provided as an aqueous solution comprising said acid or salt thereof, a first solvent being water and a second, organic solvent. In an alternative embodiment, the acid or salt thereof are provided in the form of a solution comprising the acid or salt thereof and an organic solvent.

In any of the aforementioned embodiments, the organic solvent may be selected from the group consisting of aliphatic alcohols, ethers and diethers having from 4 to 14 carbon atoms, glycols, alkoxylated glycols, glycol ethers, alkoxylated aromatic alcohols, aromatic alcohols, and mixtures thereof. According to a preferred embodiment, the solvent is ethylene glycol, methanol, ethanol, propanol, or a mixture thereof, and most preferably ethanol. According to one exemplary embodiment, the acid or salt thereof is provided in the form of an aqueous composition comprising phosphoric acid, water, and ethanol, preferably in a weight ratio of 1:1:1.

In case the acid or salt thereof are provided in the form of a liquid composition, for example as a suspension or solution (including aqueous solutions), the acid or salt thereof is present in the liquid composition in an amount of from 0.1 to 100 wt %, preferably from 1 to 80 wt %, more preferably from 3 to 60 wt %, and most preferably from 10 to 50 wt %, each based on the total weight of the liquid composition.

(E) Formation of the Water-Insoluble Pattern

In step (e) of the process according to the present invention, the deliquescent salt provided in step (b), the quantum dots provided in step (c) and the acid or salt thereof provided in step (d) are deposited onto at least one surface region of a suitable substrate such that the deliquescent salt, the quantum dots and the acid or salt thereof are at least partially contacted to form at least one water-insoluble pattern on and/or within said substrate.

It is a requirement of the present invention, that the deliquescent salt and the acid or salt thereof are selected such that the cation of the deliquescent salt and the anion of the acid or salt thereof are capable of forming a water-insoluble salt. The skilled person will thus select an appropriate deliquescent salt and an appropriate acid or salt thereof, which are capable of forming said water-insoluble salt when brought into contact, according to his general technical knowledge. Furthermore, water-insoluble salts are known in the art.

For example, it is known to the skilled person that calcium chloride and phosphoric acid will form water-insoluble calcium phosphate. In a similar manner, silver nitrate and hydrochloric acid will form water-insoluble silver chloride, calcium chloride and sodium carbonate will form water-insoluble calcium carbonate, magnesium chloride and sodium bicarbonate will form water-insoluble magnesium carbonate, or calcium chloride and sodium oxalate will form water-insoluble calcium oxalate.

It is understood by the person skilled in the art that by at least partially contacting the ink components provided in steps (b) to (d), a water-insoluble salt is formed on and/or within the substrate building up the desired water-insoluble pattern and comprising the cation of the deliquescent salt, the quantum dots and the anion of the acid or salt thereof. Non-limiting examples for water-insoluble salts that may be formed in the inventive method are calcium phosphate, magnesium phosphate, aluminium phosphate, iron phosphate, copper phosphate, calcium carbonate, iron carbonate, zinc carbonate, copper carbonate, silver chloride or calcium oxalate.

The pattern obtained by the inventive method is a water-insoluble pattern meaning that the pattern (including the quantum dots) is hardly washed out with water or that the pattern (including the quantum dots) is at least more difficult to wash out with water compared with conventional security elements. The inventive water-insoluble pattern is also resistant towards mechanical stress.

The water-insoluble pattern may be in the form of any preselected pattern. According to one embodiment, the water-insoluble pattern is a channel, a barrier, an array, a one-dimensional bar code, a two-dimensional bar code, a three-dimensional bar code, a security mark, a number, a letter, an alphanumerical symbol, a text, a logo, an image, a shape, a braille marking, or a design.

The water-insoluble pattern according to the present invention, may be formed on the substrate, i.e. on the surface of the substrate without permeating into the substrate. For example, this may be the case for non-porous materials such as metals. However, it is also possible that the water-insoluble pattern is formed within the substrate, for example, after absorption of the deposited treatment compositions into the bulk of a permeable substrate such as paper. The water-insoluble pattern may also be formed both, within the substrate and on the surface of the substrate.

In one embodiment, the water-insoluble pattern is formed on the substrate. According to another embodiment the water-insoluble pattern is formed within the substrate. According to a preferred embodiment, the water-insoluble pattern is formed on and within the substrate.

The quantum dots which form part of the network of the water-insoluble pattern allow for the detection of the pattern, for example at a specific wavelength, while their concentration may be so low that they are not detectable by established analytical methods such as energy-dispersive X-ray analysis (EDS).

The inventors also have found that, if the colour of the substrate and the colour of the water-insoluble pattern are the same or similar, a hidden pattern can be formed on or within the substrate. Without being bound to any theory, the inventors believe that due to different light scattering properties of the water-insoluble pattern and the surrounding surface of the substrate, the water-insoluble pattern may be invisible when viewed at a first angle relative to the surface of the substrate, and visible when viewed from a second angle relative to the surface of the substrate.

According to one embodiment, the water-insoluble pattern is thus invisible when viewed at an angle of from 80° to 100°, preferably about 90°, relative to the surface of the substrate, and visible when viewed at an angle of from 10° to 50°, preferably from 20 to 30°, relative to the surface of the substrate. Preferably, the water-insoluble pattern is viewed under ambient light. The surface of the substrate, relative to which the viewing angle is defined, is the surface on which the water-insoluble pattern is applied. According to another embodiment, the water-insoluble pattern is invisible to the un-aided or naked human eye when viewed at a first angle relative to the surface of the substrate under ambient light, and visible to the un-aided or naked human eye when viewed at a second angle relative to the surface of the substrate under ambient light.

According to still another embodiment, the water-insoluble pattern is invisible when illuminated at an angle from 80° to 100°, preferably about 90°, relative to the surface of the substrate, and visible when illuminated at an angle from 10° to 50°, preferably from 20 to 30°, relative to the surface of the substrate. In still another embodiment, the water-insoluble pattern is invisible to the un-aided or naked human eye when illuminated at a first angle relative to the surface of the substrate, and visible to the un-aided or naked human eye when illuminated at a second angle relative to the surface of the substrate.

In addition to the aforementioned possible visual detection at different angles or detection at a specific wavelength, a further advantage of the present invention is that the water-insoluble pattern may have an embossed structure due to the formation of the water-insoluble salt on the surface of the substrate. This may provide the possibility of haptically detecting the water-insoluble pattern on the printed substrate, which may advantageous for blind people and partially sighted users. Thus, the method of the present invention may also be used to create a tactile pattern on a substrate. For example, the method of the present invention may be used to create tactile graphics such as tactile pictures, tactile diagrams, tactile maps, or tactile graphs, or it may be used to create a braille marking such as a braille text.

As already indicated hereinabove, each ink component (i.e. the deliquescent salt, the quantum dots and the acid or salt thereof) may be provided and deposited in neat form or, preferably in the form of a liquid composition.

In one embodiment, the deliquescent salt provided in step (b), the quantum dots provided in step (c) and/or the acid or salt thereof provided in step (d) are thus provided (i.e. deposited in step (e)) in the form of a liquid composition, preferably the deliquescent salt provided in step (b), the quantum dots provided in step (c) and the acid or salt thereof provided in step (d) are provided in the form of a liquid composition, and wherein said liquid composition more preferably is an aqueous composition.

In principle, it is possible to deposit the components provided in steps (b) to (d) in any conceivable order. However, in order to avoid any side reactions or destruction of the quantum dots, it may be advantageous to deposit the deliquescent salt and the quantum dots simultaneously or, if the deliquescent salt and the quantum dots are deposited consecutively in any order, to deposit the deliquescent salt and the quantum dots before depositing the acid or salt thereof. In this way, the quantum dots and the acid or salt thereof may be prevented from interacting with each other in the absence of the deliquescent salt.

Therefore, in step (e) of the inventive method, the deliquescent salt and the quantum dots are (i) deposited simultaneously, preferably before depositing the acid or salt thereof, or the deliquescent salt and the quantum dots are (ii) deposited consecutively in any order, preferably before depositing the acid or salt thereof.

In case the deliquescent salt and the quantum dots are deposited simultaneously, preferably before depositing the acid or salt thereof, it is possible to provide (i.e. deposit) the deliquescent salt and the quantum dots together in one single composition, for example a liquid composition. In one embodiment, the deliquescent salt provided in step (b) and the quantum dots provided in step (c) are thus provided together in one single liquid composition, wherein the deliquescent salt and the quantum dots are deposited simultaneously, preferably before depositing the acid or salt thereof provided in step (d).

In case the ink components used in the inventive method are deposited consecutively or separately, the corresponding surface regions onto which these components are deposited may differ in shape (provided that they overlap at least partially).

The details and embodiments discussed herein with respect to liquid compositions comprising a deliquescent salt or quantum dots apply accordingly to compositions comprising both, the deliquescent salt of step (b) and the quantum dots of step (c).

In a preferred embodiment, the deliquescent salt of step (b) and the quantum dots of step (c) are provided together in one single liquid composition, wherein the deliquescent salt and the quantum dots are deposited simultaneously, preferably before depositing the acid or salt thereof provided in step (d), and wherein the liquid composition is an aqueous solution comprising the deliquescent salt, the quantum dots, a first solvent being water and a second, organic solvent.

In an exemplary embodiment of the inventive method, deliquescent salt provided in step (b) and the quantum dots provided in step (c) are provided together in one single liquid composition, wherein the deliquescent salt and the quantum dots are deposited simultaneously, preferably before depositing the acid or salt thereof provided in step (d), the liquid composition is an aqueous solution comprising the deliquescent salt, the quantum dots, a first solvent being water and a second, organic solvent, and wherein the deliquescent salt is a water-soluble $Ca^{2+}$ salt, the quantum dots are Cd-based quantum dots, preferably CdTe quantum dots, the acid is phosphoric acid and the organic solvent is ethanol.

In a particularly preferred embodiment, the organic solvent may be selected from the group consisting of aliphatic alcohols, ethers and diethers having from 4 to 14 carbon atoms, glycols, alkoxylated glycols, glycol ethers, alkoxylated aromatic alcohols, aromatic alcohols, and mixtures thereof. According to a preferred embodiment, the solvent is ethylene glycol, methanol, ethanol, propanol, or a mixture thereof, and most preferably ethanol.

According to still another embodiment, the method according to the present invention does not comprise a step of depositing an alkaline metal or alkaline earth metal oxide, an alkaline metal or alkaline earth metal hydroxide, an alkaline metal or alkaline earth metal alkoxide, an alkaline metal or alkaline metal earth methylcarbonate, an alkaline metal or alkaline earth metal hydroxycarbonate, an alkaline metal or alkaline earth metal bicarbonate, an alkaline metal or alkaline earth metal carbonate, or mixtures thereof.

In general, any conceivable technique may be applied in step (e) to deposit the components of the present invention onto the substrate. It is also possible to use different methods for different ink components. For example, it is possible to deposit the deliquescent salt and the quantum dots, separately or together in one single composition, by inkjet printing and to deposit the acid or salt thereof by using spray coating.

Suitable techniques for depositing the deliquescent salt provided in step (b), the quantum dots provided in step (c) and/or the acid or salt thereof provided in step (d) include electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating and/or a pencil.

In a preferred embodiment, the deliquescent salt provided in step (b), the quantum dots provided in step (c) and/or the acid or salt thereof provided in step (d) is/are deposited by inkjet printing or spray coating, most preferably by inkjet printing.

In a more preferred embodiment, the deliquescent salt provided in step (b), the quantum dots provided in step (c) and/or the acid or salt thereof provided in step (d) is/are deposited by inkjet printing, wherein the drop spacing is less than or equal to 1 000 µm.

According another preferred embodiment said drop spacing is from 10 nm to 500 µm, preferably from 100 nm to 300 µm, more preferably from 1 µm to 200 µm, and most preferably from 5 µm to 100 µm. According to another preferred embodiment of the inventive method, the drop spacing is less than 800 µm, more preferably less than 600 µm, even more preferably less than 400 µm, and most preferably less than 80 µm. According to still another preferred embodiment, the drop spacing is less than 500 nm, more preferably less than 300 nm, even more preferably less than 200 nm, and most preferably less than 80 nm. The drop spacing can also be zero, which means that the drops perfectly overlap.

In one embodiment, the deliquescent salt provided in step (b), the quantum dots provided in step (c) and/or the acid or salt thereof provided in step (d) is/are provided in the form of a liquid composition which is deposited onto the at least one surface region of the substrate in an amount of from 1 to 250 $g/m^2$, preferably of from 5 to 200 $g/m^2$, more preferably of from 15 to 150 $g/m^2$, and most preferably of from 35 to 65 $g/m^2$.

In case the deliquescent salt provided in step (b), the quantum dots provided in step (c) and/or the acid or salt thereof provided in step (d) is/are provided in the form of a liquid composition, they may be deposited in the form of drops having a volume of less than or equal to 10 µl. According to one embodiment, the drops have a volume from 5 nl to 10 µl, preferably from 10 nl to 5 more preferably from 50 nl to 2 µland most preferably from 200 nl to 750 nl. In another embodiment, the drops have a volume of less than 10 µl, preferably less than 5 µl, more preferably less than 2 µl, and most preferably less than 750 nl.

According to still another embodiment, the drops have a volume from 10 fl to 500 pl, preferably from 100 fl to 200 pl, more preferably from 500 fl to 100 pl, and most preferably from 1 pl to 30 pl. According to another embodiment, the drops have a volume of less than 1 000 pl, preferably less than 600 pl, more preferably less than 200 pl, even more preferably less than 100 pl, and most preferably less than 30 pl.

(F) Further Aspects and Embodiments

The method according to the present invention comprises step (e) of depositing onto the substrate provided in step (a) each ink component provided in steps (b) to (d), such that the deliquescent salt, the quantum dots and the acid or salt thereof are at least partially contacted to form at least one water-insoluble pattern on and/or within said substrate.

The inventive method may comprise further steps. For example, the method may comprise a step of drying the substrate after depositing thereon one or more of the components provided in steps (b) to (d). In one embodiment, the method thus further comprises a step of drying the substrate after depositing the deliquescent salt provided in step (b), after depositing the quantum dots provided in step (c) and/or after depositing the acid or salt thereof provided in step (d). In a preferred embodiment the method comprises a step of drying the substrate after depositing the deliquescent salt provided in step (b), the quantum dots provided in step (c) and depositing the acid or salt thereof provided in step (d).

The drying can be carried out by any method known in the art, and the skilled person will adapt the drying conditions, such as the temperature, according to his process equipment. For example, the substrate can be dried by infrared drying and/or convection drying. The drying step may be carried out at room temperature, i.e. at a temperature of 20° C.±2° C. or at other temperatures. According to one embodiment, the drying is carried out at 25 to 150° C., preferably 50 to 140° C., and more preferably from 75 to 130° C.

To remove residual amounts of the used ink components after the water-insoluble pattern is formed, the at least one surface region may be washed or rinsed with aqueous solutions, preferably with water. Washing or rinsing of the substrate surface may be carried out before or after drying of the surface, and preferably before drying.

One or more additives generally known to skilled person may also be deposited onto the substrate using the inventive method. Such additives may either be deposited or applied separately or they may be deposited together in one single composition with any of the ink components provided in steps (b) to (d) of the inventive process.

Suitable additives include, for example, printing inks, pigmented inks, colorants, fluorescent dyes, phosphorescent dyes, ultraviolet absorbing dyes, near infrared absorbing dyes, thermochromic dyes, halochromic dyes, metal salts, transition metal salts, magnetic particles, and mixtures thereof. Such additional compounds can equip the water-insoluble pattern with additional features, such as specific light absorption properties, electromagnetic radiation reflection properties, fluorescence properties, phosphorescence properties, magnetic properties, electric conductivity, whiteness, brightness and/or gloss.

Accordingly, in one embodiment the deliquescent salt provided in step (b), the quantum dots provided in step (c) and/or the acid or salt thereof provided in step (d) is/are provided in the form of a liquid composition, wherein said composition comprises one or more additives selected from the group consisting of printing inks, pigmented inks, colorants, fluorescent dyes, phosphorescent dyes, ultraviolet absorbing dyes, near infrared absorbing dyes, thermochromic dyes, halochromic dyes, metal salts, transition metal salts, magnetic particles, and wherein said liquid composition more preferably is an aqueous composition.

In still another embodiment, the acid or salt thereof provided in step (d) is provided in the form of a liquid composition further comprising a metal salt or transition metal salt selected from the group consisting of aluminium chloride, iron chloride and zinc carbonate. Preferably, said metal salt or transition metal salt is present in an amount from 0.1 to 10 wt %, more preferably from 0.5 to 7 wt %, and most preferably from 1 to 5 wt %, based on the total weight of said composition.

In case the deliquescent salt provided in step (b), the quantum dots provided in step (c) and/or the acid or salt thereof provided in step (d) is/are provided in the form of a liquid composition (such as the liquid compositions discussed hereinabove), said composition may further comprise one or more agents selected from the group consisting of dispersants, surfactants, rheology modifiers, lubricants, defoamers, biocides, preservatives, pH controlling agents, mineral filler materials such as kaolin, silica, and talc, or polymeric binders.

The method according to the present invention may further comprise a step of applying a protective layer and/or a printing layer above the water-insoluble pattern. Said protective layer can be made from any material that is suitable to protect the water-insoluble pattern against unwanted environmental impacts or mechanical wear.

Examples for suitable materials are resins, varnishes, silicones, polymers, metal foils, or cellulose-based materials.

The protective layer may be applied to the substrate by any method known in the art and suitable for the material of the protective layer. Suitable methods are, for example, air knife coating, electrostatic coating, metering size press, film coating, spray coating, extrusion coating, wound wire rod coating, slot coating, slide hopper coating, gravure, curtain coating, high speed coating, lamination, lacquering, printing, adhesive bonding, and the like.

The present invention makes use of three different ink components which are deposited (e.g. by inkjet printing) onto a substrate to form a water-insoluble pattern. These components include the deliquescent salt provided in step (b), the quantum dots provided in step (c) and the acid or salt thereof provided in step (d). Another aspect of the present invention thus relates to a printing ink set that comprises each of these individual components as set components. A set component in the meaning of the present invention may be an ink container or an ink cartridge.

More precisely, one aspect of relates to a printing ink set for producing a water-insoluble pattern on and/or within a substrate, the set comprising:
(i) a first set component that contains a deliquescent salt comprising a cation;
(ii) a second set component that contains quantum dots; and
(iii) a third set component that contains an acid comprising or being capable of forming an anion, or a salt thereof comprising said anion;
characterized in that the deliquescent salt and the acid or salt thereof are selected such that the cation of the deliquescent salt and the anion of the acid or salt thereof are capable of forming a water-insoluble salt.

Still another aspect relates to a printing ink set for producing a water-insoluble pattern on and/or within a substrate, the set comprising:
(i) a first set component that contains a deliquescent salt comprising a cation, and quantum dots; and
(ii) a second set component that contains an acid comprising or being capable of forming an anion, or a salt thereof comprising said anion;
characterized in that the deliquescent salt and the acid or salt thereof are selected such that the cation of the deliquescent salt and the anion of the acid or salt thereof are capable of forming a water-insoluble salt.

In one embodiment of the present invention, the printing ink set is a printing ink set for use in inkjet printing.

The method of the present invention may be used with a number of substrates (see the section disclosing suitable substrates). Accordingly, another aspect of the present invention relates to a substrate comprising the water-soluble pattern obtainable by the inventive method.

In particular, the substrate may be a paper substrate that does not contain a mineral filler coating and/or an internal mineral filler because the inventors found that the components provided in steps (b) to (d) of the inventive method (i.e. the deliquescent salt, the quantum dots and the acid or salt thereof) alone are sufficient for producing the desired water-insoluble pattern. It is thus possible to form a water-insoluble pattern on a variety of substrates without being limited to specific surface features of the substrate. The method according to the present invention further allows to form a water-insoluble pattern within porous substrates, and therefore is not limited to the surface of a substrate such as conventional printing and coating technology. Thus, a water-insoluble pattern can be formed that is less easy to reproduce by a potential counterfeiter.

The formed pattern can differ from the untreated external surface of the substrate in terms of tactility, surface roughness, gloss, light absorption, electromagnetic radiation reflection, fluorescence, phosphorescence, magnetic property, electric conductivity, whiteness and/or brightness. These distinguishable properties can be utilized to detect the pattern visually, tactilely, or at alternative conditions, for example, under UV light or near infrared light using an appropriate detector, and can render it machine readable. The method of the present invention may thus also be used to permanently validate or invalidate tickets or documents in a discreet way.

Generally, the treated substrate comprising the water-insoluble pattern of the present invention may be employed in any product that is subject to counterfeiting, imitation or copying. Furthermore, the substrate comprising the water-insoluble pattern of the present invention may be employed in non-security or decorative products. The substrate comprising the water-insoluble pattern of the present invention may also be employed for analytical or diagnostic devices.

Depending on the substrate, possible application include printing applications, analytical applications, diagnostic applications, bioassays, chemical applications, electrical applications, security devices, overt or covert security elements, brand protection, micro lettering, micro imaging, decorative, artistic or visual applications, and packaging applications. Accordingly, possible products include tools for bioassays, microfluidic devices, lab-on-a-chip devices, paper-based analytical and/or diagnostic tools, separation platforms, print media, packaging materials, data storages, security documents, non-secure documents, decorative substrates, drugs, tobacco products, bottles, garments, containers, sporting goods, toys, games, mobile phones, CDs, DVDs, blue ray disks, machines, tools, car parts, stickers, labels, tags, posters, passports, identification cards, driving licenses, bank cards, credit cards, bonds, tickets, vouchers, postage stamps, tax stamps, banknotes, certificates, brand authentication tags, business cards, greeting cards, tactile documents, or wall papers.

EXAMPLES

The scope and interest of the invention may be better understood on basis of the following examples which are intended to illustrate embodiments of the present invention.

(A) Analytical Methods

Digital Photographs and Illumination

Images of prepared samples were recorded with an EOS 600D digital camera equipped with a Canon Macro lens, EF-S 60 mm, 1:2.8 USM (Canon Japan).

For illumination under ambient light conditions, a RB 5055 HF Lighting Unit (Kaiser Fototechnik GmbH & Co. KG, Germany) was used. The prepared samples were placed in the centre of the mid table of the lighting unit and were illuminated with one of the two lamps, wherein the distance between the substrates and the centre of the lamp was about 50 cm. For illumination under UV light, a handheld UV light MR 96 B Minilight (MR Chemie GmbH, Germany) having a peak wavelength at 365 nm was used.

Energy-Dispersive X-Ray (EDS) Analysis

The prepared samples were examined by a Sigma VP field emission scanning electron microscope (Carl Zeiss AG, Germany) The backscattered electron images were recorded in COMPO-Mode with a chamber pressure of about 50 Pa in order to visualize differences in the chemical composition of the sample. The heavier the atomic weight of the elements present, the brighter the particle appears in the image.

The energy-dispersive X-ray images were recorded with an Oxford X-Max SDD-detector (Silicon Drift Detector) 50 mm$^2$ (Oxford Instruments PLC, United Kingdom) and chamber pressure about 40-90 Pa (40-60 Pa for surfaces/ approx. 90 Pa for cross-sections). Dot-mappings and EDS-analysis were taken with the energy dispersive x-ray detector (EDS). The EDS-detector determines the chemical elements of a sample and can show the position of the elements in the sample.

(B) Examples

The following example is not to be construed to limit the scope of the claims in any manner whatsoever.
Materials
Substrate A commercial paper type "ANTIK" from Security Paper Mill (SPM), Praha, Czech Republic was used. It is a pulp-based, surface-seized slightly yellowish art paper having a basis weight of 130 g/m$^2$.
Ink Composition A: Deliquescent Salt and Quantum Dots An aqueous ink composition containing 35 wt % calcium chloride, 10 wt % ethanol, and 55 wt % water was prepared.

8 g of the above calcium chloride ink composition were mixed with 0.005 g of CdTe core-type quantum dots functionalized with COOH function (#777951-25MG from Sigma-Aldrich).
Ink Composition B: Deliquescent Salt and Quantum Dots An aqueous ink composition containing 35 wt % calcium chloride, 10 wt % ethanol, and 55 wt % water was prepared.

7.9 g of the above calcium chloride ink composition were mixed with 2.4 g of blue luminescent graphene quantum dots (BGQDs) prepared in water solvent (item number: 06-0336, 100 mL, CAS 7735-18-5, LOT No. 21418300 from Strem Chemicals, Inc.)
Ink Composition C: Acid An aqueous ink composition containing 40 wt % phosphoric acid, 24 wt % ethanol, and 36 wt % water was prepared.
Preparation of Patterned Substrate and Results An inkjet printer (Dimatix DMP 2831, Fujifilm Dimatix Inc., USA) with 10 µl droplet size at a drop spacing of 30 µm was used.

Example 1

The substrate was inkjet printed in form of a pre-defined pattern first with ink composition A (deliquescent salt and CdTe quantum dots) described above. After 15 min, ink composition C (acid) was then inkjet printed onto the same substrate in form of the same pattern and at the same position.

Figure 1:
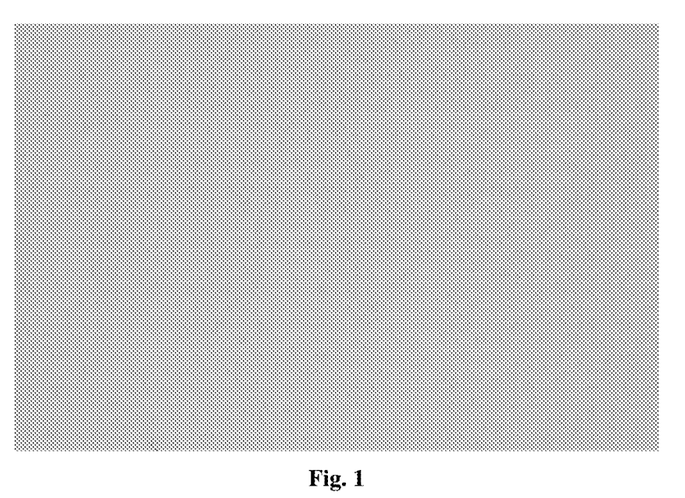
FIG. 1 shows a treated substrate with the inventive water-insoluble pattern under ambient light from a top view (about 90°).
Figure 2:
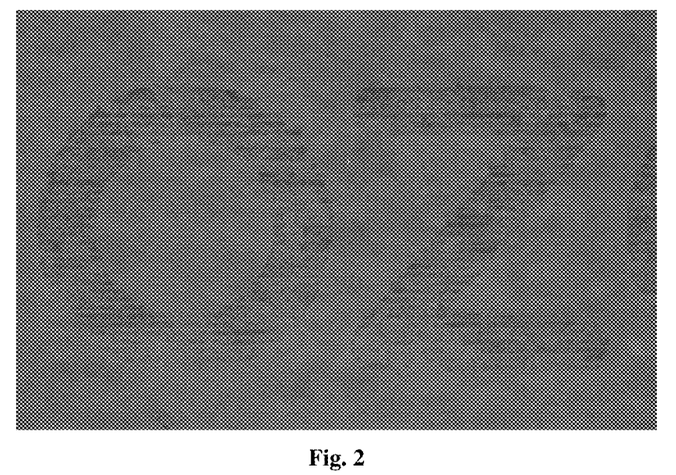
FIG. 2 shows the same treated substrate with the inventive water-insoluble pattern under UV light (365 nm).

The formed water-insoluble pattern was hardly visible to the naked eye from a top view (about 90°) on the substrate under ambient light conditions (see FIG. 1). The elements of the quantum dots (Cd, Te) were not detectable by EDS. However, the printed pattern became visible (red, fluorescence) under UV light at 365 nm (see FIG. 2).

Example 2

The substrate was inkjet printed in form of a pre-defined pattern first with ink composition B (deliquescent salt and graphene quantum dots) described above. After 15 min, ink composition C (acid) was then inkjet printed onto the same substrate in form of the same pattern and at the same position.

Figure 3:
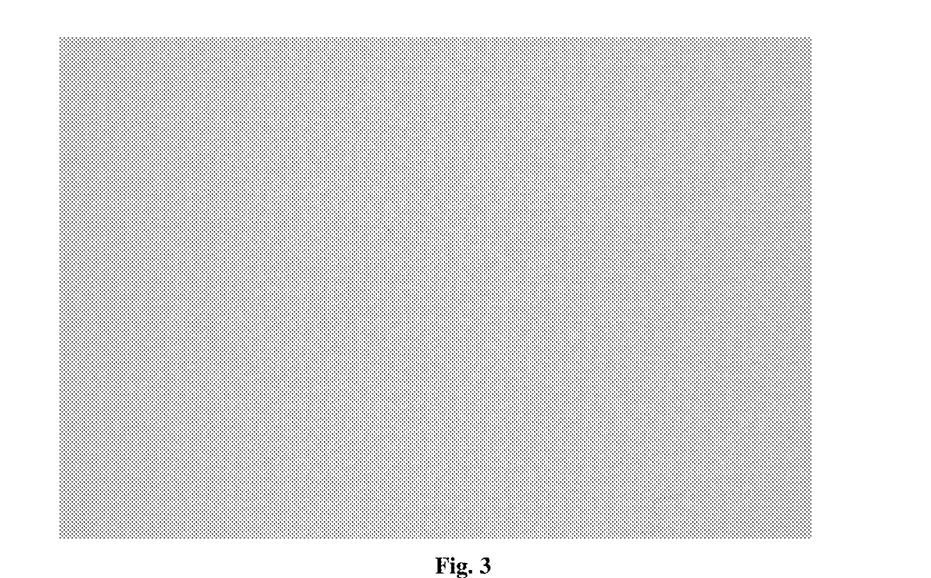
FIG. 3 shows a treated substrate with the inventive water-insoluble pattern under ambient light from a top view (about 90°).
Figure 4:
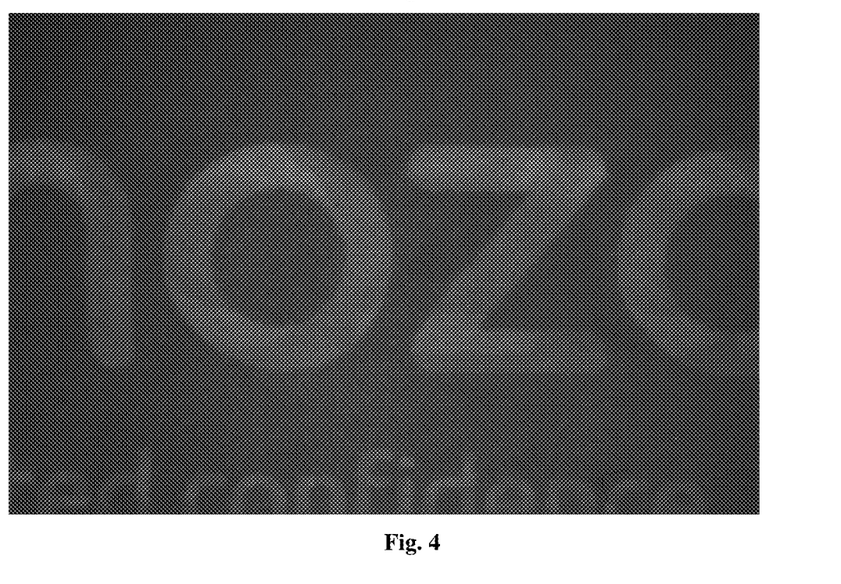
FIG. 4 shows the same treated substrate with the inventive water-insoluble pattern under UV light (365 nm).

The formed water-insoluble pattern was hardly visible to the naked eye from a top view (about 90°) on the substrate under ambient light conditions (see FIG. 3). The printed pattern became visible (blue, fluorescence) under UV light at 365 nm (see FIG. 4).

The invention claimed is:

1. A method for producing a water-insoluble pattern on and/or within a substrate, the method comprising the following steps:
    (a) providing a substrate;
    (b) providing a deliquescent salt comprising a cation;
    (c) providing quantum dots;
    (d) providing an acid or a salt thereof comprising said anion, wherein the acid is a Brønsted-Lowry acid; and
    (e) depositing the deliquescent salt provided in step (b), the quantum dots provided in step (c) and the acid or salt thereof provided in step (d) onto at least one surface region of the substrate provided in step (a) wherein the deliquescent salt, the quantum dots and the acid or salt thereof are at least partially contacted to form at least one water-insoluble pattern on said substrate, within said substrate, or both on and within said substrate,
    wherein (i) the deliquescent salt and the quantum dots are deposited simultaneously or (ii) the deliquescent salt and the quantum dots are deposited consecutively in any order.

2. The method according to claim 1, wherein the deliquescent salt provided in step (b), the quantum dots provided in step (c), the acid or salt thereof provided in step (d), or a combination thereof, is/are provided in the form of a liquid composition.

3. The method according to claim 1, wherein the deliquescent salt provided in step (b) and the quantum dots provided in step (c) are provided together in one single liquid composition, wherein the deliquescent salt and the quantum dots are deposited simultaneously.

4. The method according to claim 1, wherein the substrate is a planar substrate having a first side and a reverse side, and
    (i) the deliquescent salt provided in step (b), the quantum dots provided in step (c) and the acid or salt thereof provided in step (d) are deposited onto said first side of the substrate, or
    (ii) the deliquescent salt provided in step (b), the quantum dots provided in step (c) and the acid or salt thereof provided in step (d) are deposited onto said reverse side of the substrate.

5. The method according to claim 1, wherein the substrate is a planar substrate having a first side and a reverse side, and
    (i) the deliquescent salt provided in step (b) and the quantum dots provided in step (c) are deposited onto said first side of the substrate and the acid provided in step (d) is deposited onto said reverse side of the substrate, or
    (ii) the acid or salt thereof provided in step (d) is deposited onto said first side of the substrate and the deliquescent salt provided in step (b) and the quantum dots provided in step (c) are deposited onto said reverse side of the substrate.

6. The method according to claim 1, wherein the method further comprises a step of drying the substrate after depositing the deliquescent salt provided in step (b), after depositing the quantum dots provided in step (c), after depositing the acid or salt thereof provided in step (d)), or a combination thereof.

7. The method according to claim 1, wherein the deliquescent salt is selected from the group consisting of chlorates, sulphates, halides, nitrates, carboxylates, chlorides, bromides, iodides, citrates, acetates, zinc iodide, manganese chloride, calcium chlorate, cobalt iodide, copper chlorate, manganese sulphate, stannic sulphate, magnesium chloride, calcium chloride, iron chloride, copper chloride, zinc chloride, aluminium chloride, magnesium bromide, calcium bromide, iron bromide, copper bromide, zinc bromide, aluminium bromide, magnesium iodide, calcium iodide, magnesium nitrate, calcium nitrate, iron nitrate, copper nitrate, silver nitrate, zinc nitrate, aluminium nitrate, magnesium acetate, calcium acetate, iron acetate, copper acetate, zinc acetate, aluminium acetate, and mixtures and hydrates thereof.

8. The method according to claim 1, wherein the quantum dots are selected from:
(i) metal-based quantum dots;
(ii) CdTe quantum dots;
(iii) carbon quantum dots;
(iv) peptide-based quantum dots;
and mixtures of any of the foregoing.

9. The method according to claim 1, wherein the acid is selected from the group consisting of hydrochloric acid, sulphuric acid, sulphurous acid, phosphoric acid, oxalic acid, tartaric acid, carbonic acid and mixtures thereof.

10. The method according to claim 2, wherein:
(i) the deliquescent salt is present in the liquid composition in an amount of from 0.1 to 100 wt %, based on the total weight of the liquid composition;
(ii) the quantum dots are present in the liquid composition in an amount of from 0.0001 to 20 wt %, based on the total weight of the liquid composition;
(iii) the acid or salt thereof is present in the liquid composition in an amount of from 0.1 to 100 wt %, based on the total weight of the liquid composition; or
(iv) a combination thereof.

11. The method according to claim 1, wherein the deliquescent salt is calcium chloride, the quantum dots are CdTe quantum dots, and the acid is phosphoric acid.

12. The method according to claim 1, wherein the substrate is selected from the group consisting of paper, cardboard, containerboard, plastic, cellophane, textile, wood, metal, glass, mica plate, cellulose, nitrocellulose, cotton, marble, calcite, natural stone, composite stone, brick, concrete, tablet, canvas, natural materials of human or animal origin, and laminates or composites thereof.

13. The method according to claim 1, wherein the deliquescent salt provided in step (b), the quantum dots provided in step (c) and/or the acid or salt thereof provided in step (d) is/are deposited by electronic syringe dispensing, spray coating, inkjet printing, offset printing, flexographic printing, screen printing, plotting, contact stamping, rotogravure printing, powder coating, spin coating, reverse gravure coating, slot coating, curtain coating, slide bed coating, film press, metered film press, blade coating, brush coating, a pencil, or a combination thereof.

14. The method according to claim 1, wherein the water-insoluble pattern is a channel, a barrier, a one-dimensional bar code, a two-dimensional bar code, a three-dimensional bar code, a security mark, a number, a letter, an alphanumerical symbol, a text, a logo, an image, a braille marking, a shape, a design, or a combination thereof.

15. The method of claim 1, wherein the deliquescent salt, the quantum dots, or both are deposited before depositing the acid or salt thereof.

16. The method of claim 2, wherein the deliquescent salt provided in step (b), the quantum dots provided in step (c) and the acid or salt thereof provided in step (d) are provided in the form of a liquid composition.

17. The method of claim 2, wherein the deliquescent salt provided in step (b), the quantum dots provided in step (c) and the acid or salt thereof provided in step (d) are provided in the form of an aqueous composition.

18. The method of claim 1, wherein the deliquescent salt and the acid or salt thereof are selected so that the cation of the deliquescent salt and the anion of the acid or salt thereof form a water-insoluble salt.

* * * * *